United States Patent [19]
Hansen

[11] Patent Number: 5,330,827
[45] Date of Patent: Jul. 19, 1994

[54] REINFORCING FIBRES AND A METHOD OF PRODUCING THE SAME

[75] Inventor: Anders S. Hansen, Oksbol, Denmark

[73] Assignee: Danaklon A/S, Varde, Denmark

[21] Appl. No.: 921,985

[22] Filed: Aug. 3, 1992

Related U.S. Application Data

[63] Continuation of Ser. No. 314,573, Feb. 8, 1989, abandoned.

[30] Foreign Application Priority Data

Sep. 30, 1987 [DK] Denmark .......................... 5146/87

[51] Int. Cl.$^5$ .................. B32B 5/16; B32B 13/02; D02G 3/02; D04H 1/58
[52] U.S. Cl. .................. 428/283; 428/288; 428/289; 428/292; 428/372; 428/703; 428/910; 52/DIG. 7; 57/907
[58] Field of Search .............. 428/372, 315.7, 364, 428/521, 523; 264/205; 52/DIG. 7; 57/907

[56] References Cited

U.S. PATENT DOCUMENTS

| | | | |
|---|---|---|---|
| 4,132,556 | 1/1979 | Camprincoli et al. | 106/90 |
| 4,166,091 | 8/1979 | Beebe | 264/205 |
| 4,457,973 | 7/1984 | Matsui et al. | 428/372 |
| 4,627,950 | 12/1986 | Matsui et al. | 428/372 |
| 4,867,881 | 9/1989 | Kinzer | 428/315.7 |

FOREIGN PATENT DOCUMENTS

| | | | |
|---|---|---|---|
| 943729 | 3/1974 | Canada. | |
| 963619 | 3/1975 | Canada. | |
| 1114120 | 12/1981 | Canada. | |
| 0006318 | 1/1980 | European Pat. Off.. | |
| 0024539 | 11/1981 | European Pat. Off. | C04B 31/34 |
| 0026581 | 5/1983 | European Pat. Off.. | |
| 0228365 | 7/1987 | European Pat. Off.. | |
| 0240167 | 10/1987 | European Pat. Off.. | |
| 50-3423 | 1/1975 | Japan. | |
| 8601810 | 3/1986 | PCT Int'l Appl.. | |
| 1364442 | 8/1974 | United Kingdom. | |

OTHER PUBLICATIONS

Czechoslovakian Author's Certificate No. 258 223, P. Michlik et al; Apr. 14, 1989 English Translation.
Chemical Abstracts vol. 92, (1980), abstract 98556h, Nakamura et al.
Maslowski, Fiber World No. 3, 1985, p. 10.
Chinese reference re chalk and barytes as fillers.
Nielsen, Mechanical Properties of Polymers and Composites, vol. 2, pp. 404–407.
Ahmed, M., Polypropylene Fibers Science and Technology, p. 108, 1982.
Ahmed, M., Polypropylene Fibers Science and Technology, pp. 564–566, 589–590, 599–604 and 619–620.
Partial translation of Japanese Kokai No. 62-79239 (Apr. 11, 1987).
Partial translation of Japanese Kokai No. 61-235439 (Oct. 20, 1986).
Partial translation of Japanese Kokai No. 53-52717 (May 13, 1978).
Full translation of Japanese Kokoku No. 59-2687 (Jan. 20, 1984).

*Primary Examiner*—James D. Withers
*Attorney, Agent, or Firm*—Birch, Stewart, Kolasch & Birch

[57] ABSTRACT

Reinforcing fibres made from polyolefin and polyolefin derivatives, the fibres having a thickness of 10–100 μm and containing inorganic particles of a size of 1–10 μm in an amount of at least 12% by weight, calculated on the total fibre weight, the particles being embedded in the polyolefin or polyolefin derivative, substantially none of the particles being exposed at fibre surfaces. The inorganic particles are preferably chalk or barium sulphate. The fibres are prepared from a fibrillated, stretched, blown or cast film, which may have been subjected to a surface treatment such as a corona treatment or application of avivage. The reinforcing fibers are useful in composite materials comprising an inorganic binder such as cement and puzzolane.

20 Claims, 1 Drawing Sheet

FIG. 1

FIG. 2

REINFORCING FIBRES AND A METHOD OF PRODUCING THE SAME

This application is a continuation of application Ser. No. 07/314,573 filed on Feb. 8, 1989, now abandoned.

The present invention relates to fibre-reinforced composite materials, to reinforcing particle-containing polyolefin fibres, and to methods of preparing the fibres.

FIELD OF THE INVENTION

For many years, fibres of different types have been employed to reinforce inorganic and organic composite materials. One example of a previously widely used type of fibre is the asbestos fibre, the use of which, however, has been limited in recent years owing to the health hazards of this fibre. Also, plastic fibres of different types have been widely employed. Especially, fibres made from polyolefin have been found useful as they are easy and inexpensive to prepare and confer advantageous reinforcing properties to the composite materials in question.

In some cases, the polyolefin fibres have been difficult to distribute evenly in the matrix material and the fixation of the smooth polyolefin material in the matrix material has not been satisfactory. Several researchers have found that incorporation of fine particles in the polyolefin mass constituting the fibres results in fibres which are more easy to disperse and which adhere very well to the matrix material, probably because of voids and protuberances and other irregularities in the fibre surface resulting from the presence of the particles at the surfaces. Examples of such particle incorporation is given by Ellis in European Patent Application No. 0 026 581 and by Firth in European Patent Application No. 0 006 318, wherein a particle content of at the most 10% by weight of the total fibre weight is employed.

BRIEF DISCLOSURE OF THE PRESENT INVENTION

The present invention relates to polyolefin fibres in which a high concentration of particles (well in excess of 10%, calculated on the total weight of the fibres and the particles) is present, but with substantially none of the particles being exposed at fibre surfaces. Due to the special properties conferred to the fibres hereby, the fibres are easy to disperse in the matrix material and become excellently fixed therein. In addition, the fibres confer very advantageous properties regarding strength and flexibility to the matrix materials in which they are present, compared with materials which are reinforced with conventional polyolefin fibres. This is in spite of the fact that the fibres per se do not show any superior properties in relation to the conventional polyolefin fibres regarding strength and bending properties.

DETAILED DISCLOSURE OF THE PRESENT INVENTION

More specifically, the present invention relates to reinforcing fibres made from polyolefin or polyolefin derivatives, the fibres having a thickness of 10-100 μm and containing inorganic particles of a size of 1-10 μm in an amount of at least 12% by weight, calculated on the total fibre weight, the particles being embedded in the polyolefin or polyolefin derivatives, substantially none of the particles being exposed at fibre surfaces.

Preferably, the inorganic particles are incorporated in an amount of at least 15%, such as at least 17% by weight of the total fibre weight in the reinforcing fibres. Most preferably, the inorganic particles are incorporated in an amount of 17%, calculated by weight of the total fibre weight.

The reinforcing fibres may be prepared by a method comprising the following steps:
extruding the fibre constituents which are in the form of a plastic mass so as to obtain a film
stretching the film to orient the polyolefin chains of the film substantially unidirectionally,
fibrillating the stretched film by a knife and/or pin roller,
heat treating the stretched film to relax any tensions of the film,
treating the surface of the film to modify the surface, and
optionally cutting the fibrillated film into pieces of a suitable length so as to obtain fibres.

In greater detail, this method may be performed as follows:

The fibre components, which will be discussed below, are mixed so as to obtain a homogeneous dispersion of the particles in the polyolefin or polyolefin-derived material, i.e. the plastic component. The mixing characteristics, e.g. the vigor and time of mixing, depend on the kind as well as on the amount of particles employed. Conventionally, the higher the amount of particles, the longer and more vigorous the mixing has to be. When the amount of particles exceeds about 20%, calculated by weight of the total weight of the fibre components, the particles may be difficult to disperse. If fibres of that high particle content are desired, usually very harsh mixing conditions must be employed.

With fibres of a particle content of less than 20% by weight of the total fibre weight, usually no problems of obtaining an homogeneous mixing of the fibre components are observed.

The plastic component, i.e. the polyolefin or polyolefin derivative which normally is solid at temperatures under 160° C., is melted so as to obtain a plastic mass before the extrusion is carried out. The melting may be performed in any suitable equipment, conveniently in the extruder which is used for the subsequent extrusion. Conveniently, the mixing of the fibre components is carried out in the extruder simultaneously with the melting of the plastic component. A homogeneous distribution of the particles is normally obtained within the time required to totally melt the plastic component. Depending on the type and amount of the plastic component as well as on the equipment used, the time of melting (and mixing) may be less than 10 minutes, and in most cases about 5 minutes. Obviously, the mixing temperature will depend on the melting point of the plastic component in question. The particles may also be added to the plastic component during the melting of this component.

After a plastic mass has been obtained from the fibre constituents, the mass is extruded through a die of a dimension which is suited to the desired film dimension so as to obtain a film which is subsequently cooled.

By the cooling, the polymeric material crystallizes, and the crystallization pattern is dependent on the type of cooling employed as well as on the polyolefin or polyolefin-derived material employed. Typically, the crystallized material comprises amorphous and crystalline structures which are mixed among each other. The ratio between the volume of the crystalline and the amorphous areas is conventionally designated the degree of crystallization.

The extrusion may be performed so as to obtain a blown film. By this procedure, the plastic mass is extruded through a circular ring, resulting in an air-filled bag of the fibre material. The bag is cooled by passage through a second ring, a cooling ring, after which it is passed through rollers, resulting in the formation of a two-layered film. By this procedure, the rate of cooling is relatively low, resulting in a relatively large degree of crystallization of the plastic component. Also, relatively large crystals are formed.

However, the extrusion may also result in a cast film, where the plastic mass is extruded through a flat die whereby a one-layered film is obtained. This is cooled either in a water bath or by passage through one or more pairs of cold rollers. The temperatures of the water bath and the cold rollers, respectively, are suitably about ambient temperature. The water bath is especially useful as a cooling agent for rather thick films, as this type of cooling is faster and more homogeneous than the cooling through rollers.

The extruded film is then subjected to stretching. This is done in order to orient the polyolefin chains of the polyolefin or the polyolefin-derived material substantially unidirectionally so as to obtain a high tensile strength and an increased modulus of elasticity in the direction of the fibres. Also the fibrillation which follows after the stretching is made easier by the stretching.

The method employed for stretching the film is not critical, and any method and equipment may be used. Conveniently, the film is stretched in an airheated oven or in a liquid medium such as water or an oil. The temperature of the oven will depend on the type of film to be stretched, but will in most cases be about 130°-200° C., such as about 165° C. The film may be passed through the oven or the liquid medium by means of two pairs of rollers which are situated before (the first pair of rollers) and after (the second pair of rollers) the oven or the liquid medium, respectively. The speed of the second pair of rollers is higher than the speed of the first pair of rollers, resulting in a stretching of the film between the two pairs of rollers.

The initial part of the stretching results in a necking of the film so that microfibrils are formed in the film. Microfibrils are defined as being constituted by crystal blocks in the longitudinal direction of the film which are surrounded by an amorphous area. Normally, the microfibrils are gathered in bundles which are termed fibrils. The microfibrils and the fibrils are oriented parallelly to each other in the direction of stretching. Following the initial necking, the film is further deformed by the stretching so that the microfibrils are displaced and moved further apart from each other.

The relation between the speeds of the two pairs of rollers defines the stretch ratio, i.e. the extent of stretching. Preferably, the film is stretched in a ratio of at least 1:6, such as at least 1:10, and particularly in a ratio of at least 1:15. Most preferably, the film is stretched in a ratio of 1:17. This latter stretch ratio may be obtained e.g. by letting the film pass the first pair of rollers at a speed of 5 m/min. and the second pair of rollers at a speed of 85 m/min.

The stretching may cause tensions in the film to develop. These may be relaxed by subjecting the stretched film to heating. Conveniently, this is done by passing the film through an oven in which the film is allowed to shrink. It is important that this heat-setting or relaxation takes place at a temperature lower than the temperature of the stretching. As regards polypropylene, which is one of the preferred polyolefin components of the fibres of the invention, this heat-setting takes place at about 130° C. After this treatment, the residual shrinking will be very modest (3-5%) at temperatures below 130° C.

The fibrillation or the splitting in the longitudinal direction of the stretched film as it may also be defined, is carried out on a knife and/or pin roller with a faster peripheral speed than the speed with which the film is carried along. The pin roller is a cylinder equipped with sticks in the direction of the movement of the film which are provided with closely spaced pins. The fibrillation results in a net-like structure of the film with small fibrils.

As the polyolefin or the polyolefin-derived material is resistent and thus inactive towards most chemicals, it may be necessary to modify the surface of the fibrillated film so as to obtain a satisfactory interaction of the fibres and the matrix material which they are to reinforce. The surface of the fibrillated film may be modified by heat treatment, and/or subjected to chemical modification, electrical modification, and/or mechanical modification.

One type of heat treatment which has been found to be very effective is passage through a gas flame. This breaks some molecular bonds and gives a possibility of creating polar groups on the surface.

The chemical treatment may take place in various ways, e.g. by copolymerization, compounding of powder, or by applying a liquid on the surface. The chemical employed is selected according to the properties desired on the surface, e.g. good fixation of fibres to cement. Especially chemical treatments comprising introduction of OH—, COOH— and/or anhydride groups in the polyolefin component have been found to be advantageous. Examples of chemicals which are suitable for introduction of these groups are, respectively, vinyl alcohol, acrylic acid, and maleic acid anhydrid.

An example of an electrical treatment which has been found to confer very desirable properties to the film and which is widely used in the plastic fibre production throughout the world, is the corona treatment. This treatment is a vigorous electrical discharge from a special electrode down to the surface of the film. A rather high voltage is required (about 25 KV and 20 KHz) in order for the electrons to get sufficient energy to penetrate the surface. When the electrons hit the polymer chains at a high speed, many of these chains will be broken, thus giving a possibility of forming carbonyl groups by means of the ozone ($O_3$) in the air. The formation of a carbonyl group makes the surface of the film polar and thus more suitable for reaction with other chemical substances.

The mechanical treatment may comprise sandblasting and may, e.g., be carried out in a sandblasting chamber as described in Example 1 hereinafter. However, many other useful mechanical treatments exist, the essential feature being to obtain a further splitting of the surface of the film in the longitudinal direction. Also texturing, i.e. making the film surface wavy, e.g. as described below in Example 1, is a very effective means of modifying the surface.

In some cases, it may be advantageous to alter or modify the surface properties of the fibres and/or the fibrillated film so as to make these suited for specific uses. The fibres and/or the fibrillated film may be made hydrophilic, hydrophobic or antistatic or may be made more easy to disperse in the matrix material in question. The surface modification comprises treating the fibres and/or the fibrillated film with a surfactant such as a wetting agent, e.g. a so-called "hydrophillic avivage" (also termed "hydrophyllic rewetting agent" or "hydrophillic lubricant") or an anti-static agent. The surfactant to be used is of a type which will satisfy the qualitative demands of the fibre surface in question. For instance, when the fibre surface is to be hydrophilic, surfactants such as AMOA P 231, Amoa Chemicals, Hinchley, Leicestershire, England, Cithrol A, Croda, Cowich Hall, North Humberside, England, or SW-T, Nissin Kagaku Kenkyosho Ltd., Japan, may be employed. The surfactant is normally employed in the last stage of the fibre preparation process, i.e. prior to cutting. It is typically used in an amount of about 0.15–3% by weight of the fibrillated film material, more typically about 0.4–1.6% by weight of the fibrillated film material. Specific examples of treatment of the fibre surface are given in the Examples which follow.

The fibrillated film material which has been subjected to one or more of the modifications or surface treatments discussed above is subjected to cutting so as to obtain fibres of a suitable length. Preferably, the length of the fibres is at the most 15 mm, more preferably at the most 12 mm, and especially at the most 6 mm. The maximum lengths stated above are to be considered as true maximum lengths for substantially all of the fibres in the mixture. However, a small amount of fibres may be of a length which exceeds these maximum lengths and still be considered to be within the scope of the present invention.

The fibres which result from the treatments discussed above are preferably of a width of 20–700 $\mu$m, more preferably 60–300 $\mu$m, and especially about 250 $\mu$m. Fibres which form a network wherein the length of the individual fibres is shorter than the length of the slits between the fibres have been found especially useful. This is the case, e.g. when the film is to be cut into chopped fibres, where it will be advantageous that the slit length is larger than the fibre length, so as to avoid interconnection between the individual fibres.

It is believed that the advantageous effect of employing particle-containing fibres in composite materials is obtained by the establishment of a capillary action between the matrix material and the fibres. By microscopic studies it has been observed that fine pores are present in the film when the film has been subjected to stretching. It is believed that these pores constitute a connection between the particles of the fibres and the matrix material in which the fibres are embedded. As the particles are conveniently of a hydrophilic type, they may absorb water, usually in the form of moisture, from the matrix material and thereby some sort of binding and/or advantageous fixation is established.

Substantially all of the particles are totally embedded in the polyolefin or polyolefin-derived material so that the surface of the fibres appears smooth, having no bulges or other irregularities owing to the presence of the particles. It appears from this that the size of the particles must be correlated to the final thickness of the fibres so that the largest dimension of the particles, in the case of compactly formed particles the diameter, is smaller than the final fibre thickness. Without limiting the scope of the present invention but being stated as a rule of thumb, the largest dimension, or the size of the particles, is at the most about one third of the final fibre thickness. As stated above, the fibres are of a thickness in the range of 10–100 $\mu$m, and are preferably of a thickness in the range of 20–80 $\mu$m. Most preferably, the fibres are of a thickness of 35 $\mu$m. The inorganic particles are of a size in the range of 1–10 $\mu$m. The lower limit is qualified as particles smaller than 1 $\mu$m are difficult to disperse homogeneously throughout the polyolefin or polyolefin-derived fibre component. The higher limit is based on practice and also on the above discussed relations between fibre thickness and particle size. Preferably the inorganic particles are of a size in the range of 2–7 $\mu$m, in particular 3–5 $\mu$m.

The inorganic particles are conveniently of a type which do not damage the equipment used for the preparation of the fibres. Normally, the die of any extruder used will be sensitive to hard materials, such as metals and other correspondingly hard materials, which are passed through the die. Thus, the inorganic particles are conveniently selected from rather soft materials (or, expressed in another manner, materials which will not damage the extruder die to any substantial extent) which in addition fulfil the desired properties discussed above, i.e. the hydrophilicity and the particle size. Examples of suitable inorganic particles are chalk, talc, silica, mica, cement, barium sulphate, glass, and a dyeing agent, e.g. $TiO_2$. Especially, chalk and barium sulphate have been found useful, presumably owing to their distinct hydrophilicity. Also, the considerable density of the barium sulphate as compared with the other useful particle types stated (4.5 $g/cm^3$ vs. about 2.2–3.0 $g/cm^3$) is believed to make the mixing of the particles in the below discussed polyolefin or the polyolefin derivative easier and more effective. In some cases, it may be desirable that the particle-containing fibres are coloured. Many dyeing agents, e.g. $TiO_2$, of the above defined particle properties may conveniently be used for this purpose.

Apart from the inorganic particles, the fibres are constituted by a plastic polymer material, such as polyolefin, which is constituted by carbon and hydrogen, or a polyolefin derivative.

Preferably, the polyolefin is selected from polypropylene and polyethylene. Polypropylene is a well-known constituent of plastic fibres and has been used as such for many years owing to its resistance towards acids and bases, its advantageous strength properties, its low density, as well its low price. The properties of a typical polypropylene fibre, commonly known as KRENIT ®, is illustrated in the Examples which follow.

As it appears from Table 2 of Example 1 below, the addition of inorganic particles to the polypropylene fibre constituent often results in fibres of less advantageous properties regarding strength and modulus of elasticity than those of the plain polypropylene fibre. However, when the fibres are constituents in a composite material comprising an inorganic binder, the opposite effect can be observed. As appears from Example 2, Tables 3 and 4 below, the employment of the particle-containing fibres in composite materials makes these materials surprisingly strong and flexible as compared to materials wherein plain polypropylene fibres are employed.

Also, a variety of polyolefin derivatives has proved to be useful as particle-containing fibre constituents. Examples of these are vinyl polymers such as polyvinyl alcohol comprised of carbon, hydrogen, and oxygen, as well as acrylic acid and organic acid anhydrides, such as maleinic acid anhydride.

An especially advantageous fibre composition comprises polypropylene in an amount of 83% and chalk in an amount of 17%, calculated by weight.

Another advantageous fibre composition comprises polypropylene in an amount of 86% and barium sulphate in an amount of 14%, calculated by weight.

Depending on the kind of material in which the fibres are to be used as well on the use of the resulting material, the fibres may further comprise other additives in order to obtain properties which are suited to the use in question. These additives may comprise antioxidants and UV stabilizers which may avoid decomposition of the plastic materials of the fibres. Typically, the antioxidants and UV stabilizers are added in an amount of 0.5-5% by weight of the total fibre composition, and examples of suitable antioxidants and UV stabilizers are Irganox and Chimnasorb, respectively. Also, flame retardants may be employed. These may be combinations of an aromatic bromo-containing composition and antimony trioxide ($Sb_2O_3$), for example Sandoflam 5071, Sandoz, Switzerland.

The particle-containing fibres of the present invention are preferably used as constituents in inorganic matrix-based materials or composite materials such as building materials, typically in order to improve the physical properties of these materials. The fibres may conveniently be used as substitutes for asbestos fibres. Typically, the composite materials comprise an inorganic binder which may be cement, e.g. Portland, gypsum, puzzolane such as fly ash, silica, wollastonite, and/or bentonite. Additionally, the composite material may contain a superplasticizer, e.g. a compound of sulphonated naphthalene. Examples of composite materials in which the fibres of the invention may be employed, are cement-based matrix materials such as concrete and mortar. The fibres are typically supplied in an amount of 0,1-10% by weight of the total composite material, such as about 5% by weight of the total composite material, and a fibre content of about 3% by weight of the total composite material has been found especially useful. The amount of fibres employed is of course dependent on the type of composite material to be produced. Also, the methods of producing the composite materials will vary with the kind of composite material to be prepared. Composite materials, in which the particle-containing fibres of the present invention may be employed, are e.g. such materials disclosed in U.S. Pat. No. 4,636,345 (Jensen et al).

As regards fibre-reinforced cement materials, an amount of polypropylene fibres of about 1.5-3% by weight of the total weight of the composite material has been found advantageous. In mortar material, the development of cracks has been found to be reduced when plastic fibres have been added to the mortar material. Also, the use of plastic fibres results in concretes of higher tensile strength and flexibility.

Figure 1:
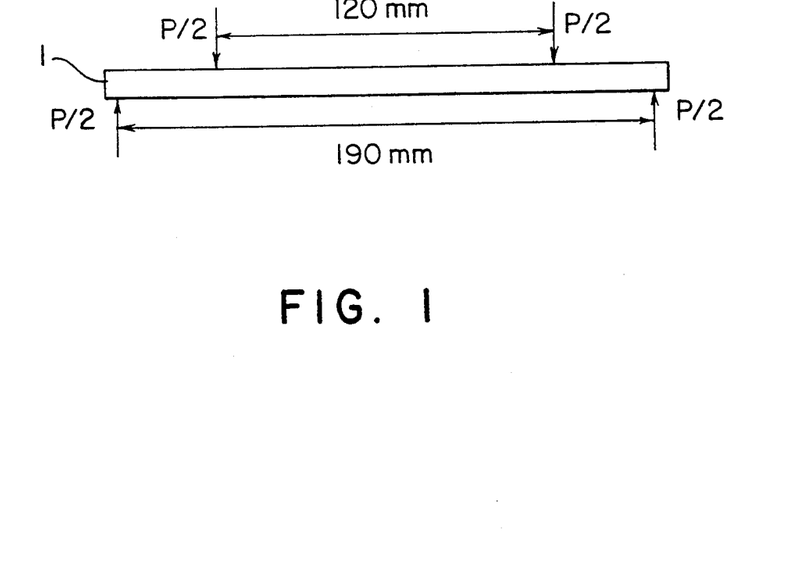

FIG. 1 illustrates the principle of a four point loading test of fibre reinforced composite materials. The plate 1 is placed in a testing machine of any convenient type and subjected to loadings as illustrated. P is the magnitude of the total load applied to the plate.

Figure 2:
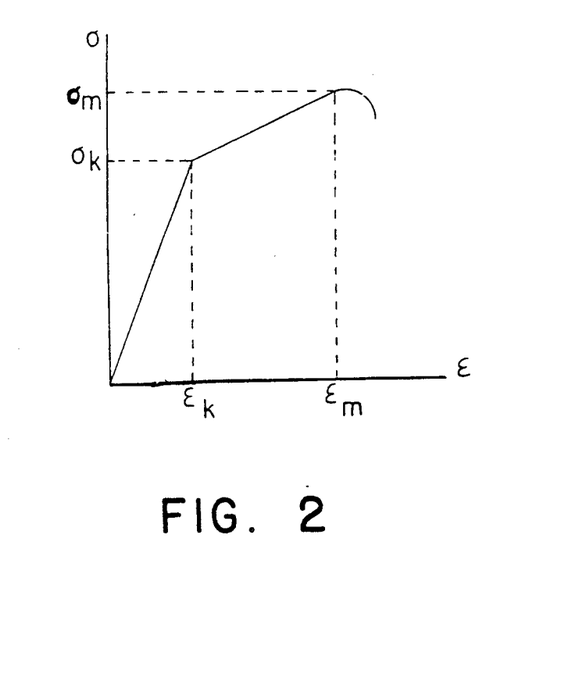

FIG. 2 is a graphic illustration of the stress ($\sigma$)/strain ($\epsilon$) properties of the plates of Example 2 which resulted from the four-point loading test illustrated in FIG. 1. From this graph, the modulus of elasticity, which is the slope of the first linear part of the graph, and the energy of rupture being the area below the graph, are determined.

The present invention is further illustrated in the following examples.

EXAMPLE 1

PREPARATION OF FILM FIBRILLATED FIBRES

The preparation of fibres comprised most of the following steps:
preparing a polyolefin film by extrusion
stretching the polyolefin film
fibrillating the stretched film
heat setting the stretched, fibrillated film
treating the surface of the film
cutting the film The composition and the preparation characteristics of each of the fibre variants prepared are listed in Table I which follows below the following description of each of the process steps.

Preparing the polyolefin film by extrusion

The polyolefin and particles components of the polyolefin film, optionally in admixture with additives, were mixed in an extruder of the type Bandera ($\phi$ 60 mm, L/D=24) at a temperature of 210° C. for 5 min., and extruded through a circular die of a diameter of 300 mm in the form of a blown film. In this way, an air-filled bag of the film was formed, the blow ratio, i.e. the ratio between the diameter of the bag and the diameter of the circular die being 1.02. The extruded film was cooled by passage through a cooling ring which was placed on the top of the die. After the cooling the air-filled film bag was passed through a pair of nip rollers at a speed of 5.5 mm/min. so as to drive out the air and produce a double-layered film.

Stretching the polyolefin film

From the nip rollers, the film was passed through a second pair of rollers situated below the nip rollers. The film was then passed through an oven of a temperature of 165° C. and a third pair of rollers situated on the other side of the oven. The blown film was stretched in the oven as the speed of the third pair of rollers was higher than the speed of the second pair of rollers. The actual stretching ratio, i.e. the ratio between the speed of the two pairs of rollers, for each of the film variants prepared is stated in Table I.

Fibrillating the stretched film

The stretched film was passed over a pin roller having 26 pins/cm stick. The number of pin rows of each cm of the roller surface was 0.55. The film to be fibrillated was passed over the pin rollers at a speed of 230 m/min.

Heat setting the stretched, fibrillated film

The heat setting of the film was performed by passing the film through an oven heated with air of a temperature of 130° C. The film was moved at a speed of 92 m/min.

During the treatments described below (the surface treatment and cutting), the film was moved at a speed of about 87.0 m/min, corresponding to about 95% of the speed of the film during the heat setting.

Treating the surface of the film

Mechanical treatment

Sand-blasting

The film was passed through a sand-blasting channel constructed by applicants, wherein the film was bombarded with fine glass spheres of a diameter of 45 μm. This treatment resulted in a more rough surface of the film and furthermore a further splitting of the film in the direction of the film movement.

Profilation of the film surface

The surface of the film was made profiled with a wave structure in the longitudinal direction by pressing a heated cable having a waved surface (having 100 waves per 10 cm) against the film. The pressure created by the rollers on the film was gradually increased, after which the pressure was released and the cable was removed. This procedure is also known as the stuffer-box technique.

Chemical treatment

Treatment with a surfactant.

The surfactant was added to the film when it was passed through a pair of lubricant application (lick) rollers, and the amount of surfactant to be deposited on the film was regulated by the speed of rotation of the rollers. In Table I below the actual amount and the composition of the surfactant is stated for each of the fibre variants.

Electrical treatment

The film was subjected to a strong electric discharge by passage under an electrode of the type Vetaphone T1200. The voltage of the electrode was about 25 KV and 30 KHz (12 KW). This electric treatment is also known as a corona treatment.

Cutting the film

The cutting of the film was performed by passing the film tangentially over a wheel of a diameter of 468 mm on which knives were placed radially. The film was pressed against the knives by a roller-derived pressure. The lengths of the resulting fibres were equal to the distance between the radially placed knives.

Different types of fibres were prepared in accordance with the above described methods. Each type of fibre is designated so that its composition as well as its preparation characteristics appear from its designation. As an abbreviation for polypropylene, PP is used. The characteristics of each of the fibre variants are stated below:

TABLE I
FIBRE VARIANTS

Fibre consisting of PP (Variant A)
Composition: 99.74% of polypropylen of the type
Propathene GWE 23, supplied by ICI.
MFI = 2.5 g/10 min. at 2.16 kg/230° C.
(MFI is the Melt Fluid Index as determined in accordance with the standard ISO 1133.
A mixture of polypropylene, UV stabilizer and antioxidant of the following composition was prepared:
8% Chimnasorb 944,
12% Irganox ® B501 W
80% polypropylene,
the Irganox ® B501 W consisting of
25% Irganox ® 1425
25% polyethylene was,
50% Irgafox 168
The percentages stated above are weight percentages.
1.3% of this mixture was added to the polypropylene resulting in a total amount of the UV stabilizer and antioxidant of 0.26% by weight based on the total weight of the composition.
Stretch ratio: 1:17
Fibre length: 6 mm
Surface treatment: Chemical:
The film was treated with a liquid surfactant composed of AMOA P 231 and Cithrol A, the volume ratio of the two components being 1:3. The liquid was diluted 10 times with

TABLE I-continued
FIBRE VARIANTS common tap water.
The diluted liquid was supplied to the film as described above, resulting in a degree of application of about 10%, calculated by weight of the film.
Electrical:
The film was subjected to a corona treatment as described above.
Fibre consisting of PP/chalk with a stretch ratio of 1:12 (Variant B12)
Composition: 25% of masterbatch chalk Fulline PMB-F/301 supplied by Plastigran (being of a composition of 70% chalk and 30% polypropylene).
74.74% polypropylene (Propathene GWE 23).
UV stabilizer and antioxidant as described for the PP fibre.
Stretch ratio: 1:12
Fibre length: 6 mm
Surface treatment: As the PP fibre
Corresponding fibre variants were prepared, differing from the above stated characteristics as described below:
Fibre consisting of PP/chalk with a stretch ratio of 1:17 (variant B17)
Fibre consisting of PP/chalk with a stretch ratio of 1:17 and having been subjected to sand blasting (variant B17S).
Fibre consisting of PP/chalk with a stretch ratio of 1:17 and having been subjected to sand blasting and profilation (variant B17SP).
Fibre consisting of PP/chalk with a stretch ratio of 1:20 (variant B20).
Fibre consisting of PP/Ba₂SO₄ (Variant C)
Composition: 20% masterbatch bariumsulfate Fulline PMB-F/401/BF supplied by Plastigran (being of a composition of 70% bariumsulfate and 30% polypropylene)
79.74% polypropylene Propathene GWE 23.
UV stabilizer and antioxidant as described for the PP fibre.
Stretch ratio: 1:17
Fibre length: 6 mm
Surface treatment: As the PP fibre
Special fibre consisting of PP/chalk (Variant D)
Composition: 25% masterbatch chalk Fulline PMB-F/301 (being of a composition of 70% chalk and 30% polypropylene)
74.74% polypropylene Propathene GWE 23.
UV stabilizer and antioxidant as described for the PP fibre
Stretch ratio: 1:17
Fibre length: 6 mm
Surface treatment: Mechanical:
Sand blasting as described above.
Chemical:
The film was treated with a surfactant composed of SW-T, Nissin Kagaku Kenkyosho Ltd., diluted with water, the volume ratio of surfactant and water being 1:3.8.
Electrical:
As described above.

Each of the film variants (at the stage before cutting) was subjected to a tensile test which was carried out on a Zwick-testing machine. The tests were carried out so that the length of fixation of the film was about 200 mm and the rate of deformation was 2 mm/min. The modulus of elasticity was calculated as a secant modulus at 0.2, 0.5, and 1.0% elongation, respectively. The ultimate stress was calculated as the maximum force divided by the cross-sectional area of the film. The ultimate elongation is the elongation at maximum force. The mean value resulting from 5 different tests is stated in Table II below together with the standard deviation and the coefficient of variation. Also the density of each of the film variants is stated:

The results obtained for the film variants apply for the fibre variants as well owing to the fact that the film and the fibres are different forms of the same composition. Therefore, the term fibre has been used in the following table.

TABLE II

|  |  | Mean Value | Standard deviation | Coefficient of variation (%) |
|---|---|---|---|---|
| PP FIBRE | | | | |
| Density 910 kg/m³ | | | | |
| Modulus | 0.2% | 15.1 | 2.84 | 19 |
| of elasticity | 0.5% | 12.4 | 1.39 | 11 |
| GPa | 1.0% | 10.0 | 0.63 | 6 |
| Strength MPa | | 429 | 55 | 13 |
| Ultimate elongation % | | 7.72 | 1.40 | 18 |
| PP/CHALK FIBRE, STRETCH RATIO 1:12 | | | | |
| Density 1030 kg/m³ | | | | |
| Modulus | 0.2% | 7.01 | 2.65 | 38 |
| of elasticity | 0.5% | 5.94 | 1.39 | 23 |
| GPa | 1.0% | 5.23 | 0.38 | 7 |
| Strength MPa | | 299 | 29 | 10 |
| Ultimate elongation % | | 13.27 | 0.80 | 7 |
| PP/CHALK FIBRES, STRETCH RATIO 1:17 | | | | |
| Density 1030 kg/m³ | | | | |
| Modulus | 0.2% | 8.93 | 2.32 | 26 |
| of elasticity | 0.5% | 8.56 | 1.54 | 18 |
| GPa | 1.0% | 7.39 | 0.89 | 12 |
| Strength MPa | | 321 | 37 | 12 |
| Ultimate elongation % | | 7.39 | 0.53 | 7.1 |
| PP/CHALK FIBRE, STRETCH RATIO 1:20 | | | | |
| Density 1030 kg/m³ | | | | |
| Modulus | 0.2% | 11.60 | 2.09 | 18 |
| of elasticity | 0.5% | 10.27 | 0.95 | 9 |
| GPa | 1.0% | 8.62 | 0.48 | 6 |
| Strength MPa | | 341 | 10 | 3 |
| Ultimate elongation % | | 7.14 | 0.38 | 5 |
| PP/Ba₂SO₄ FIBRE | | | | |
| Density 960 kg/m³ | | | | |
| Modulus | 0.2% | 8.39 | 0.86 | 10 |
| of elasticity | 0.5% | 9.25 | 0.65 | 7 |
| GPa | 1.0% | 8.64 | 0.56 | 7 |
| Strength MPa | | 263 | 73 | 28 |
| Ultimate elongation % | | 5.94 | 1.06 | 18 |
| SPECIAL PP/CHALK FIBRE | | | | |
| Density 1030 kg/m³ | | | | |
| Modulus | 0.2% | 8.93 | 2.32 | 26 |
| of elasticity | 0.5% | 8.56 | 1.54 | 18 |
| GPa | 1.0% | 7.39 | 0.89 | 12 |
| Strength MPa | | 321 | 37 | 12 |
| Ultimate elongation % | | 7.39 | 0.53 | 7.1 |

In accordance with the discussion above, it is evident that the fibres containing particles (all types except the PP fibre) possess less desirable properties than the fibres without particles (the PP fibre). Thus, the values of the modulus of elasticity and the strength of the PP fibre are significantly higher than the values of the corresponding properties of the particle-containing fibres and the ultimate elongation, which may be defined as the resistance to strain before rupture.

EXAMPLE 2

FIBRE-REINFORCED PLATES

Preparation of fibre-reinforced plates by filtration

A suspension consisting of 109 g of dry matter composed of

| Cellulose stora 61 SR° 50 | 4% |
|---|---|
| Elkem silica 98% | 10% |
| Polyolefin fibres | 3% |
| Cement (lowalkali, sulfate resistant) | 83% | and 163 g of water were placed in a filtering apparatus (John Mansville JM filtration apparatus). The percentages stated above are weight percentages, based on the weight of the total dry matter content. The polyolefin fibres are the fibres of Example 1. The water of the suspension was sucked off by a low pressure of 0.27 bar, after which the filter cake was placed in a press where it was subjected to a short pressure of about 10 MPa. The permeability of the material in its unhardened form was determined by means of the time of filtration. The time of filtration, i.e. the time of the low pressure treatment, of each of the plate preparations was noted.

After the forming, the plates were hardened in a wetting box for 24 hours followed by hardening under water at ambient temperature for 6 days. The plates prepared by the above process were of a length of about 203 mm, a width of about 76.5 mm, and a thickness of about 5 mm.

Mechanical properties of the fibre-reinforced places

The mechanical properties of the fibre-reinforced plates were investigated by subjecting the plates to a 4-point loading test as shown in principle in FIG. 1. 10 plates of each of the variants were tested; five of the plates were tested in a wet state and the 5 remaining plates were tested in a dry state, which was obtained by subjecting the plates to drying for 2 days in an oven of a temperature of 110° C. The stress ($\sigma$)/strain ($\epsilon$) properties of the plates as determined by the 4-point loading test was plotted in a graph which in schematic form is illustrated in FIG. 2. The stress/strain values at the point, where the proportionality between the stress and the strain changes ($\sigma_k$, $\epsilon_k$) as well as the stress/strain values at the point of maximum loading ($\sigma_m$, $\epsilon_m$) were read. From these values, the modulus of elasticity and the energy of rupture were calculated. The modulus of elasticity is defined as the slope of the first linear part of the graph, whereas the energy of rupture is defined as the area below the graph up to the maximum loading and is calculated according to the formula $$W = \tfrac{1}{2}\sigma_k\epsilon_k + \sigma_k(\epsilon_m - \epsilon_k) + \tfrac{1}{2}(\sigma_m - \sigma_k)(\epsilon_m - \epsilon_k)$$

It must be emphasized that this formula is an approximation, as usually the upper part of the graph will be slightly curved. However, the deviation from the true value will be insignificant as the difference between area related to the curved graph and the area related to the straight graph is very small in relation to the total area.

The mechanical properties of the fibre-reinforced plates are stated in the table below. As well the mean value (M) as the standard deviation (Dev.) is stated.

TABLE IIIA

|  |  | FIBRE VARIANT | | | | | |
|---|---|---|---|---|---|---|---|
|  |  | A | | C | | D | |
|  |  | wet | dry | wet | dry | wet | dry |
| Time of filtration | M | 888 | 888 | 53 | 53 | 18 | 18 |
|  | Dev. | 163 | 163 | 10 | 10 | 2 | 2 |
| Density g/cm³ | M | 1.781 | 1.669 | 1.698 | 1.644 | 1.697 | 1.664 |
|  | Dev. | 0.023 | 0.025 | 0.020 | 0.023 | 0.018 | 0.011 |
| $\sigma_k$ MPa | M | 10.1 | 18.2 | 9.7 | 17.4 | 11.2 | 23.1 |
|  | Dev. | 0.8 | 3.6 | 0.4 | 3.1 | 1.2 | 0.6 |
| $\sigma_m$ MPa | M | 13.9 | 18.2 | 13.6 | 18.0 | 17.3 | 23.3 |

TABLE IIIA-continued

|  |  | FIBRE VARIANT | | | | | |
|---|---|---|---|---|---|---|---|
|  |  | A | | C | | D | |
|  |  | wet | dry | wet | dry | wet | dry |
|  | Dev. | 0.8 | 3.6 | 1.1 | 2.8 | 1.2 | 0.5 |
| $\epsilon_k$ o/oo | M | 0.69 | 0.96 | 0.83 | 1.18 | 0.70 | 1.32 |
|  | Dev. | 0.09 | 0.27 | 0.07 | 0.30 | 0.08 | 0.15 |
| $\epsilon_m$ o/oo | M | 3.09 | 1.02 | 6.64 | 1.52 | 6.81 | 1.36 |
|  | Dev. | 0.98 | 0.32 | 1.91 | 0.28 | 2.27 | 0.14 |
| W $10^{-4}$ Mn/m$^2$ |  | 322.9 | 98.3 | 717.1 | 162.8 | 909.0 | 161.7 |
| Modulus of | M | 15.0 | 19.3 | 11.8 | 15.0 | 16.1 | 17.6 |
| elasticity GPa | Dev. | 2.7 | 2.0 | 1.2 | 1.4 | 1.4 | 1.7 |

Fibre variant A = PP fibre
Fibre variant C = PP/Ba$_2$SO$_4$ fibre
Fibre variant D = Special PP/chalk fibre

TABLE IIIB

|  |  | FIBRE VARIANT | | | | | |
|---|---|---|---|---|---|---|---|
|  |  | B17S | | B17SP | | B20 | |
|  |  | wet | dry | wet | dry | wet | dry |
| Time of | M | 33 | 33 | 18 | 18 | 47 | 47 |
| filtration | Dev. | 1 | 1 | 3 | 3 | 4 | 4 |
| Density g/cm$^3$ | M | 1.710 | 1.673 | 1.687 | 1.685 | 1.722 | 1.691 |
|  | Dev. | 0.012 | 0.020 | 0.007 | 0.022 | 0.010 | 0.027 |
| $\sigma_k$ MPa | M | 9.9 | 16.2 | 9.3 | 20.2 | 10.4 | 16.0 |
|  | Dev. | 0.5 | 1.8 | 1.2 | 0.6 | 0.5 | 3.0 |
| $\sigma_m$ MPa | M | 13.6 | 17.1 | 12.3 | 20.5 | 14.4 | 17.2 |
|  | Dev. | 1.1 | 1.6 | 1.6 | 0.6 | 0.4 | 2.0 |
| $\epsilon_k$ o/oo | M | 0.65 | 1.29 | 0.88 | 1.29 | 0.91 | 1.03 |
|  | Dev. | 0.13 | 0.13 | 0.08 | 0.23 | 0.16 | 0.20 |
| $\epsilon_m$ o/oo | M | 5.15 | 1.51 | 5.86 | 1.41 | 6.20 | 1.71 |
|  | Dev. | 2.05 | 0.32 | 2.51 | 0.37 | 2.93 | 0.36 |
| W $10^{-4}$ Mn/m$^2$ |  | 560.9 | 141.1 | 578.8 | 154.7 | 703.3 | 195.3 |
| Modulus of | M | 15.8 | 12.6 | 10.6 | 16.3 | 11.7 | 15.6 |
| elasticity GPa | Dev. | 3.8 | 1.7 | 1.3 | 4.0 | 2.5 | 0.5 |

Fibre variant B17S = PP/chalk fibre with stretch ratio 1:17 and sandblasted
Fibre variant B17SP = PP/chalk fibre with stretch ratio 1:17 and sandblasted and profilated
Fibre variant B20 = PP/chalk fibre with stretch ratio 1:20.

Preparation of fibre-reinforced plates by extrusion

Fibre-reinforced plates were prepared by extruding a slurry consisting of 43.5% cement (lowalkali, sulfate resistant)
20% fly ash
20% silica 75%
14% Wollastonite Nyad C
1.0% Mighty ® superplasticizer
1.5% polyolefin fibres, and water which was added in an amount so as to obtain a water to solid ratio of about 0.09, calculated by weight.

The percentages stated are the weight percentages calculated by weight of the solid part of the slurry. The polyolefin fibres are the fibres of Example 1, and the type of fibres employed in the preparation of the plates is stated in connection with the statements of the properties of the plates.

The plates were prepared as follows:

The fly ash, silica, polyolefin fibres, Mighty ® superplasticizer, and water were thoroughly mixed in a mixer conventionally used in the baking industry. Cement and Wollastonite were added to the resulting homogeneous mass, and the mixing was continued until these components had become totally dispersed in the mass. The resulting plastic mass was transferred to an extruder (Linden) and was extruded through a flat die directly into a rolling mill so as to obtain a thickness of the resulting plates of about 4.5 mm. The plates were cut out in pieces of dimensions of about 300 mm×about 600 mm and these were hardened for 16 hours in a hardening chamber at a temperature of 80° C. For laboratory testing, test specimens of dimensions of 202×600 mm were cut out, and these were tested in a storage-humid state at ambient temperature. The test specimens were subjected to a 4 point loading test. The test specimens were cut out so as to obtain a rupture along the direction of production, and a rupture transversely to the direction of production. The stress-strain properties defined above, i.e. $\sigma_k,\epsilon_k$ and $\sigma_m,\epsilon_m$, were determined. Also, the modulus of elasticity, the energy of rupture, and the density of the plates were determined as described above. The results, i.e. the mean value and the standard deviation, are stated in Table IV below. The results of the testing, where the rupture occurs along the direction of production, is designated A1, whereas the results of the testing, where the rupture occurs transversely to the direction of production, is designated T.

TABLE IVA

|  |  | FIBRE VARIANT | | | | | | | |
|---|---|---|---|---|---|---|---|---|---|
|  |  | A | | B17S | | C | | D | |
|  |  | A1 | T | A1 | T | A1 | T | A1 | T |
| Density g/cm$^3$ | M | 2.118 | 2.081 | 2.031 | 2.112 | 2.106 | 2.094 | 2.089 | 2.157 |
|  | Dev. | 0.015 | 0.029 | 0.141 | 0.048 | 0.043 | 0.031 | 0.054 | 0.063 |
| $\sigma_k$ MPa | M | 17.6 | 25.2 | 18.7 | 32.0 | 20.1 | 29.8 | 15.8 | 27.5 |
|  | Dev. | 1.1 | 1.4 | 2.3 | 1.3 | 1.1 | 0.7 | 2.3 | 0.9 |
| $\sigma_m$ MPa | M | 18.1 | 25.6 | 18.8 | 33.3 | 20.1 | 29.9 | 15.9 | 28.0 |
|  | Dev. | 1.1 | 1.1 | 2.4 | 0.8 | 1.1 | 0.9 | 2.2 | 0.9 |
| $\epsilon_k$ o/oo | M | 0.45 | 0.63 | 0.52 | 0.70 | 0.41 | 0.65 | 0.39 | 0.59 |
|  | Dev. | 0.03 | 0.03 | 0.08 | 0.04 | 0.11 | 0.05 | 0.04 | 0.06 |
| $\epsilon_m$ o/oo | M | 0.50 | 0.66 | 0.54 | 0.75 | 0.41 | 0.68 | 0.41 | 0.63 |
|  | Dev. | 0.04 | 0.05 | 0.08 | 0.06 | 0.11 | 0.07 | 0.04 | 0.06 |
| W $10^{-4}$ Mn/m$^2$ | M | 48.5 | 87.0 | 52.4 | 128.3 | 41.2 | 105.8 | 34.0 | 92.3 |
| Modulus of | M | 38.9 | 40.3 | 36.5 | 45.9 | 51.0 | 45.7 | 40.2 | 47.2 |
| elasticity GPa | Dev. | 1.8 | 3.3 | 6.8 | 3.7 | 11.4 | 3.9 | 3.1 | 4.4 |

Fibre variant A = PP fibre
Fibre variant B17S = PP/chalk fibre with stretch ratio 1:17 and sandblasted
Fibre variant C = PP/Ba$_2$SO$_4$ fibre
Fibre variant D = Special PP/chalk fibre

TABLE IVB

|  |  | FIBRE VARIANT | | | |
|---|---|---|---|---|---|
|  |  | B17SP | | B20 | |
|  |  | A1 | T | A1 | T |
| Density g/cm$^3$ | M | 2.103 | 2.076 | 2.124 | 2.080 |
|  | Dev. | 0.057 | 0.035 | 0.032 | 0.020 |
| $\sigma_k$ MPa | M | 19.6 | 29.7 | 19.4 | 29.8 |

TABLE IVB-continued

| | | FIBRE VARIANT | | | |
|---|---|---|---|---|---|
| | | B17SP | | B20 | |
| | | Al | T | Al | T |
| | Dev. | 1.3 | 1.3 | 0.8 | 0.8 |
| $\sigma_m$ MPa | M | 19.8 | 29.7 | 19.5 | 29.8 |
| | Dev. | 1.2 | 1.3 | 0.9 | 0.8 |
| $\epsilon_k$ o/oo | M | 0.42 | 0.70 | 0.50 | 0.67 |
| | Dev. | 0.10 | 0.05 | 0.11 | 0.06 |
| $\epsilon_m$ o/oo | M | 0.46 | 0.70 | 0.52 | 0.67 |
| | Dev. | 0.11 | 0.05 | 0.14 | 0.06 |
| W $10^{-4}$ Mn/m$^2$ | M | 49.5 | 103.95 | 52.4 | 99.8 |
| Modulus of | M | 48.5 | 42.7 | 40.2 | 45.1 |
| elasticity GPa | Dev. | 10.9 | 2.0 | | 4.7 |

Fibre variant B17SP = PP/chalk fibre with stretch ratio 1:17 and sandblasted and profilated
Fibre variant B20 = PP/chalk fibre with stretch ratio 1:20.

The results show that the plates containing the particle-containing fibres of the present invention have superior properties regarding elasticity, strength, and strain when compared to plates made with conventional polypropylene fibres.

EXAMPLE 3

FIXATION OF THE EXTRUDED, UNSTRETCHED POLYOLEFIN FILM IN CEMENT

The fixation between fibre and matrix is an important parameter in the development of plastic fibres as good fixation is a prerequisite for the possibility of utilizing the mechanical properties of the fibres, but at the same time, this parameter is very difficult to measure.

The measuring of the fixation between plastic and cement was performed on the extruded, unstretched film from which each of the fibre variants of Example 1 was prepared. A pure cement paste (Rapidcement, water/cement ratio 0.5) was applied to the plastic film and to the surfaces of two circular steel specimens of an inner diameter of 44 mm and 70 mm, respectively. The specimens were placed concentrically on either side of the plastic film so that the cement on either side of the plastic film and the cement of the respective steel specimens adhered to each other. 10 such test specimens were prepared and the cement of the specimens was hardened in a wetting box at room temperature. After 7 days, 5 of the specimens were taken out and placed freely in the laboratory (humidity 50%, temperature 21° C.) (dry hardening) and the others remained in the wetting box (humidity 95-100%, temperature 21° C.) (wet hardening).

After setting for another 7 days, the fixation properties of each of the polyolefin films were tested. The two concentrically arranged circular steel specimens were twisted from each other by means of a moment torque, and the torsion moment obtained was read.

The resulting maximum shear stress was $$\tau_{max} = \frac{M_v}{W_v}$$

in which $M_v$ is the torque and $W_v$ is the torque reaction. The latter was calculated as follows:

$$W_v = \frac{\pi}{2} \cdot \frac{b^4 - a^4}{b} = 56835 \text{ m}^3$$

a = the inner radius of the smaller steel specimen = 44/2 mm
b = the inner radius of the larger steel specimen = 70/2 mm The results of the tests of the extruded, unstretched film from which the fibre variants were prepared appear from table V below.

TABLE V

| Extruded, unstretched film with the composition of | | | |
|---|---|---|---|
| | FIBRE VARIANTS | | |
| | A | B | C |
| $\tau_{dry}$ MPa | 0.163 | 0.331 | 0.414 |
| $V_{dry}$ MPa | 0.008 | 0.006 | 0.009 |
| $\tau_{wet}$ MPa | 0.209 | 0.314 | 0.308 |
| $V_{wet}$ MPa | 0.007 | 0.004 | 0.013 |

Fibre variant A = PP fibre
Fibre variant B = PP/chalk fibres
Fibre variant C = PP/Ba$_2$SO$_4$ fibre
$\tau_{dry}$ is the mean value of maximum shear stress of the 5 test specimens which were hardened partly in the wetting box and partly at ambient conditions in the laboratory.
$\tau_{wet}$ is the mean value of maximum shear stress of the 5 test specimens which were hardened solely in the wetting box.
$V_{dry}$ and $V_{wet}$ are the standard deviation of $\tau_{dry}$ and $\tau_{wet}$, respectively.

It appears from the results that the values for films containing particles are systematically better than for films without particles. Furthermore, the values from the test specimens subjected to dry hardening are better than those from specimens subjected to wet hardening. This is contrary to the results observed with the PP fibres (containing no particles).

We claim:

1. A fiber-reinforced composite material comprising an inorganic cement-based binder and reinforcing fibers, wherein the reinforcing fibers have been prepared by fibrillation of a film made from a polyolefin or polyolefin derivative, the film having been stretched in a ratio of at least 1:15, the fibers having a thickness of 10-100 μm and containing inorganic particles selected from the group consisting of chalk, talc, silica, mica, barium sulphate, glass, and a dyeing agent, the particles having a size of 1-10 μm and being present in the fibers in an amount of 12-20% by weight, calculated based on the total fiber weight, the particles being embedded in the polyolefin or polyolefin derivative and substantially homogeneously distributed within the fibers, substantially none of the particles being exposed at fiber surfaces.

2. The fiber-reinforced composite material according to claim 1, wherein the inorganic binder is a concrete or mortar.

3. The fiber-reinforced composite material according to claim 1, wherein the inorganic particles comprise at least 15% by weight of the fibers.

4. The fiber-reinforced composite material according to claim 3, wherein the inorganic particles comprise at least 17% by weight of the fibers.

5. The fiber-reinforced composite material according to claim 1, wherein the inorganic particles are of a size of 3-5 μm.

6. The fiber-reinforced composite material according to claim 1, wherein the polyolefin is selected from the grouping consisting of polypropylene and polyethylene and the polyolefin derivative is an alcohol, an acrylic acid or an organic acid anhydride derivative of a polyolefin, the polyolefin chains of the polyolefin or polyolefin derivative being oriented substantially unidirectionally.

7. The fiber-reinforced composite material according to claim 6, wherein the alcohol is a polyvinyl alcohol.

8. The fiber-reinforced composite material according to claim 1, wherein the fibers comprise polypropylene in an amount of 83% and chalk in an amount of 17%, calculated by weight.

9. The fiber-reinforced composite material according to claim 1, wherein the fibers comprise polypropylene in an amount of 86% and barium sulphate in an amount of 14%, calculated by weight.

10. The fiber-reinforced composite material according to claim 1, wherein the thickness of the fibers is 20–80 μm.

11. The fiber-reinforced composite material according to claim 1, wherein the width of the fibers is 20–700 μm.

12. The fiber-reinforced composite material according to claim 11, wherein the width of the fibers is 60–300 μm.

13. The fiber-reinforced composite material according to claim 1, wherein the fibers are in the form of a fibrillated film in which individual fibrils form a network, the length of the individual fibrils being shorter than the length of the slits between the fibrils.

14. The fiber-reinforced composite material according to claim 1, wherein the length of substantially all of the fibers is at most 15 mm.

15. The fiber-reinforced composite material according to claim 14, wherein the length of substantially all of the fibers is 6–12 mm.

16. The fiber-reinforced composite material according to claim 14, wherein the length of substantially all of the fibers is at most 6 mm.

17. The fiber-reinforced composite material according to claim 1, wherein the fiber surface comprises a surfactant.

18. The fiber-reinforced composite material according to claim 1, wherein the reinforcing fibers have been prepared by fibrillation of a film which has been stretched in a ratio of at least 1:17.

19. The fiber-reinforced composite material according to claim 1, comprising 0.1–10% by weight of the fibers, based on the total weight of the composite material.

20. The fiber-reinforced composite material according to claim 1, which further comprises a superplastifying agent.

* * * * *